United States Patent
Yang et al.

(10) Patent No.: US 12,543,072 B2
(45) Date of Patent: Feb. 3, 2026

(54) METHOD AND SYSTEM FOR DIFFERENTIATING QoS IN INTER-MICROSERVICE COMMUNICATION

(71) Applicant: ELECTRONICS AND TELECOMMUNICATIONS RESEARCH INSTITUTE, Daejeon (KR)

(72) Inventors: Sunhee Yang, Daejeon (KR); Namseok Ko, Daejeon (KR); Sae Hyong Park, Daejeon (KR); Sung Hyuk Byun, Daejeon (KR); Hyun Kyung Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 298 days.

(21) Appl. No.: 18/221,942

(22) Filed: Jul. 14, 2023

(65) Prior Publication Data
US 2024/0155428 A1    May 9, 2024

(30) Foreign Application Priority Data
Nov. 7, 2022    (KR) .................. 10-2022-0147340

(51) Int. Cl.
*H04W 28/08*    (2023.01)
*H04W 28/02*    (2009.01)

(52) U.S. Cl.
CPC ... *H04W 28/0846* (2020.05); *H04W 28/0268* (2013.01); *H04W 28/09* (2020.05)

(58) Field of Classification Search
CPC ............. H04W 28/02; H04W 28/0215; H04W 28/0268; H04L 45/302; H04L 41/50; H04L 41/5003; H04L 41/5019
See application file for complete search history.

(56) References Cited

U.S. PATENT DOCUMENTS

| | | |
|---|---|---|
| 9,509,782 B2 | 11/2016 | Lawson et al. |
| 2013/0322405 A1 | 12/2013 | Park et al. |

(Continued)

FOREIGN PATENT DOCUMENTS

| | | |
|---|---|---|
| KR | 10-2027749 B1 | 10/2019 |
| KR | 10-2022-0061995 A | 5/2022 |

OTHER PUBLICATIONS

Fu et al., "QoS-Aware and Resource Efficient Microservice Deployment in Cloud-Edge Continuum", Jun. 28, 2021, 2021 IEEE International Parallel and Distributed Processing Symposium (IPDPS), DOI: 10.1109/IPDPS49936.2021.00102, pp. 932-941 (Year: 2021).*

(Continued)

*Primary Examiner* — Paul H. Masur
(74) *Attorney, Agent, or Firm* — LRK PATENT LAW FIRM

(57) ABSTRACT

A system for differentiating quality of service (QoS) in inter-microservice communication according to an embodiment of the present disclosure includes a network control unit generating a QoS-aware path for guaranteeing QoS between microservices; a service registration unit registering information about the QoS-aware path between the microservices; and when it is necessary to guarantee the quality of service of messages received from a sending microservice, a communication processing unit identifying the QoS-aware path between the sending microservice and a receiving microservice from the information on the registered QoS-aware path, and processing the inter-microservice communication to allow the message to be transferred to the receiving microservice through the identified QoS path.

20 Claims, 9 Drawing Sheets

(56) References Cited

U.S. PATENT DOCUMENTS

| | | | |
|---|---|---|---|
| 2019/0280847 A1 | 9/2019 | Kim et al. | |
| 2020/0162380 A1* | 5/2020 | Pilkington | H04L 45/306 |
| 2021/0028991 A1* | 1/2021 | Nataraj | H04L 41/16 |
| 2021/0211363 A1* | 7/2021 | Papacica | H04L 41/5041 |
| 2022/0035689 A1* | 2/2022 | Raheja | G06F 9/5011 |
| 2022/0121470 A1* | 4/2022 | Saxena | H04L 63/20 |
| 2023/0198959 A1* | 6/2023 | Martinez-Spessot | G06F 9/547 713/153 |

OTHER PUBLICATIONS

Shi et al., "QoS-awareness of Microservices with Excessive Loads via Inter-Datacenter Scheduling", Jul. 15, 2022, 2022 IEEE International Parallel and Distributed Processing Symposium (IPDPS), DOI: 10.1109/IPDPS53621.2022.00039, pp. 324-334 (Year: 2022).*

Pallewatta et al., "QoS-aware placement of microservices-based IoT applications in Fog computing environments", Jan. 24, 2022, Future Generation Computer Systems, vol. 131, Issn 0167-739X, https://doi.org/10.1016/j.future.2022.01.012., pp. 121-136, (Year: 2022).*

Al-Masri, Ehab, "QoS-Aware IIoT Microservices Architecture", Nov. 18, 2018, 2018 IEEE International Conference on Industrial Internet (ICII), DOI: 10.1109/ICII.2018.00030, pp. 171-172 (Year: 2018).*

Merriam-Webster, "When." Merriam-Webster.com Dictionary, https://www.merriam-webster.com/dictionary/when. Accessed Aug. 5, 2025. (Year: 2025).*

Gustav Johansson, "Investigating differences in response time and error rate between a monolithic and a microservice based architecture", MA thesis. KTH, School of Electrical Engineering and Computer Science (EECS), 2019.

Joel L. Fernandes et.al., "Performance Evaluation of RESTful Web Services and AMQP Protocol", Proceedings of 2013 Fifth International Conference on Ubiquitous and Future Networks (ICUFN), pp. 810-815, 2013.

Kaihua Fu et al., "QoS-Aware and Resource Efficient Microservice Deployment in Cloud-Edge Continuum", International Parallel and Distributed Processing Symposium (IPDPS), (Jun. 2021).

Jiuchen Shi et al., "QoS-awareness of Microservices with Excessive Loads via Inter-Datacenter Scheduling", 2022 IEEE International Parallel and Distributed Processing Symposium (IPDPS), (Jul. 2022).

* cited by examiner

METHOD AND SYSTEM FOR DIFFERENTIATING QoS IN INTER-MICROSERVICE COMMUNICATION

CROSS REFERENCE TO RELAYED APPLICATION

The present application claims priority to Korean Patent Application No. 10-2022-0147340, filed on Nov. 7, 2022, the entire contents of which is incorporated herein for all purposes by this reference.

BACKGROUND OF THE INVENTION

1. Field of the Invention

The present disclosure relates to a method and system for differentiating quality of service (QoS) in inter-microservice communication and, more specifically, to a method and system for differentiating quality of service in inter-microservice communication, which allows to differentiate QoS-aware networking path and provide integrated support for service discovery and networking information acquisition, in order to reduce total service response time while ensuring independence and asynchrony between microservices, in terms of microservice communication in a distributed architecture.

2. Description of Related Art

With the advent of 5G and 6G, various network-based applications are spreading, and these applications are evolving into distributed microservice architectures. Accordingly, compared to the existing monolithic application structure, inter-microservice communication has a very important impact on the performance and stability of the entire application service.

However, the existing technologies for inter-microservice communication use a synchronization communication method such as REST API or gRPC. Since the method is, therefore, performed in such a way that responses operate synchronously, it has a problem in processing performance and scalability. As microservices recently have spread, a message queue method that operates asynchronously between senders and receivers is being used.

The message queue method has the main goal to guarantee independence and asynchrony between service components in the application layer in inter-microservice communication. However, since this method is a central structure based on the existing TCP/IP connection model for network layer connectivity, it does not support quality of service (QoS) guarantees such as response time and bandwidth guarantees of end-to-end application services.

Therefore, in order to solve the differential support of communication performance between programmable multi-service infrastructure according to the introduction of various applications and microservices according to the proliferation of microservice structures, there is a need for a new inter-microservice communication structure and method in which the operations of the connection model of the application layer and the networking layer are organically integrated in the sliced structure.

SUMMARY OF THE INVENTION

Accordingly, an objective of the present disclosure is to provide a method and system for differentiating quality of service (QoS) in inter-microservice communication, which allows to differentiate QoS-aware networking path and provide integrated support for service discovery and networking information acquisition, in order to reduce total service response time while ensuring independence and asynchrony between microservices, in terms of microservice communication in a distributed architecture.

The technical objectives to be achieved in the present disclosure are not limited to the technical objective mentioned above, and other technical objectives will be clearly understood by those skilled in the art from the description below.

In accordance with an embodiment of the present disclosure, a system for differentiating quality of service (QoS) in inter-microservice communication includes a network control unit generating a QoS-aware path for guaranteeing QoS between microservices; a service registration unit registering information about the QoS-aware path between the microservices; and when it is necessary to guarantee the quality of service of messages received from a sending microservice, a communication processing unit identifying the QoS-aware path between the sending microservice and a receiving microservice from the information on the registered QoS-aware path, and processing the inter-microservice communication to allow the message to be transferred to the receiving microservice through the identified QoS path.

Herein, when the quality of service is requested to be guaranteed from a first microservice, the network control unit may receive network location information of the first microservice and a second microservice from the service registration unit, and generate the QoS-aware path between the first microservice and the second microservice based on the received network location information.

Herein, the communication processing unit may receive the information on the QoS-aware path updated in the service registration unit, and process the inter-microservice communication based on the updated information about the QoS-aware path.

Herein, when the microservice is created and the created microservice is enabled, the service registration unit may provide integrated control and management of service information and networking information on the QoS-aware path of the enabled microservice.

Herein, when a plurality of slices is included, the service registration unit may include each service registry that independently supports each of the plurality of slices.

Herein, the communication processing unit may include a first communication processer processing the message through the identified QoS-aware path; and a second communication processor processing the message in a message queuing method Herein, the first communication processor may be located on a host side where the microservice is located.

Herein, the communication processing unit may query the service registration unit for IDs for the sending microservice, the receiving microservice, and the quality of service path and, when the ID for the QoS-aware path exists, processes the message through the QoS-aware path of the corresponding ID.

Herein, the communication processing unit may loop-back-process the message, when the ID for the QoS-aware path is a NULL ID.

Herein, when the QoS-aware path is requested to be generated from the communication processing unit, the network control unit may calculate the QoS-aware path that satisfies the requested QoS to allocate an ID for the calculated QoS-aware path; and provide the allocated ID for the QoS-aware path to the service registration unit and the communication processing unit.

Herein, the network control unit allocates a NULL ID as the ID for the calculated QoS-aware path, when the sending microservice and the receiving microservice exist in the same host.

According to another embodiment of the present disclosure, a method of differentiating quality of service (QoS) in inter-microservice communication includes generating a QoS-aware path for guaranteeing quality of service between microservices; registering information on the QoS-aware path between the microservices; when it is necessary to guarantee the quality of service of messages received from a sending microservice, identifying the QoS-aware path between the sending microservice and a receiving microservice from the registered information on the QoS-aware path; and processing the inter-microservice communication to allow the message to be transferred to the receiving microservice through the identified QoS-aware path.

The features briefly summarized above with respect to the disclosure are merely exemplary aspects of the detailed description of the disclosure that follows, and do not limit the scope of the disclosure.

According to the present disclosure, it is possible to provide a method and system for differentiating quality of service (QoS) in inter-microservice communication, which allows to differentiate QoS-aware networking path and provide integrated support for service discovery and networking information acquisition, to reduce total service response time while maximally ensuring independence and asynchrony between microservices, in terms of microservice communication in a distributed architecture.

The effects obtainable in the present disclosure are not limited to the effects mentioned above, and other effects will be clearly understood by those skilled in the art from the description below.

DETAILED DESCRIPTION OF THE INVENTION

Figure 1:
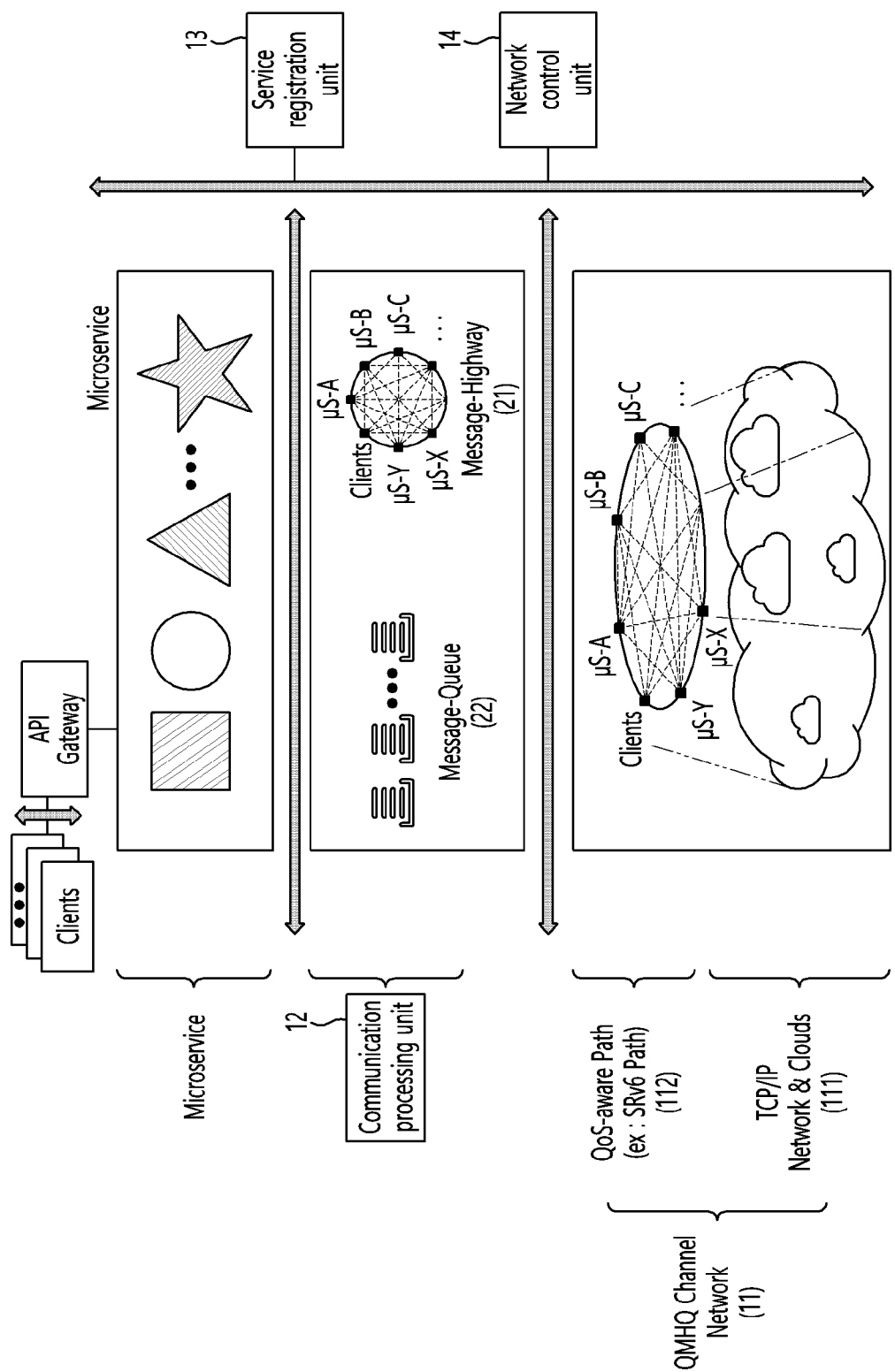
FIG. 1 shows a configuration of a QMHQ system according to an embodiment of the present disclosure.

Hereinafter, with reference to the accompanying drawings, embodiments of the present disclosure will be described in detail so that those skilled in the art can easily carry out the present disclosure. However, this disclosure may be embodied in many different forms and is not limited to the embodiments set forth herein.

Upon describing the embodiments of the present disclosure, when it is determined that a detailed description of a known configuration or function may obscure the gist of the present disclosure, a detailed description thereof will be omitted. In addition, in the drawings, parts not related to the description of the present disclosure are omitted, and similar reference numerals are attached to similar parts.

In this disclosure, when a component is said to be "connected", "coupled" or "connected" to another component, this may include not only a direct connection relationship, but also an indirect connection relationship in which another component exists in the middle. In addition, when an element "includes" or "has" another element, this means that other components may be further included without excluding other components unless otherwise stated.

In this disclosure, terms such as first and second are used only for the purpose of distinguishing one element from another, and do not limit the order or importance of elements unless otherwise specified. Thus, within the scope of the present disclosure, a first element in one embodiment may be referred to as a second element in another embodiment; and similarly, a second element in one embodiment may be referred to as a first element in another embodiment.

In this disclosure, components that are distinct from each other are intended to clearly explain each feature, and do not necessarily mean that the components are separated. In other words, a plurality of components may be integrated into one hardware or software unit, and one component may be distributed and made up of a plurality of hardware or software units. Accordingly, such integrated or distributed embodiments are included in the scope of the present disclosure even if not mentioned separately.

In this disclosure, components described in various embodiments do not necessarily mean essential components, and some may be optional components. Accordingly, an embodiment comprising a subset of elements described in one embodiment is also included in the scope of the present disclosure. In addition, an embodiment including other components in addition to components described in various embodiments is also included in the scope of the present disclosure.

In this disclosure, expressions of positional relationships used in this specification, such as top, bottom, left, right, etc., are described for convenience of description, and in the case of reverse viewing the drawings shown in this specification, the positional relationship described in the specification may be interpreted in the opposite way.

In this disclosure, phrases, such as "A or B", "at least one of A and B", "at least one of A or B", "A, B or C", "at least one of A, B and C", and "at least one of A, B or C" may include any one of the items listed together in the corresponding one of the phrases, or all possible combinations thereof.

Embodiments of the present disclosure are intended to differentiate QoS-aware networking path and provide integrated support for service discovery and networking information acquisition, to reduce total service response time while ensuring independence and asynchrony between microservices, in inter-microservice communication in a distributed architecture.

Furthermore, embodiments of the present disclosure allows inter-microservice communication to be performed quickly in a one-stop, by supporting a networking path with service qualities (e.g., bandwidth, delay, reliability, etc.) which are differentiated according to characteristics of each application domain while ensuring independence and asynchrony between microservices, and providing integrated control management of services and networking information according to dynamic arrangement/movement/removal of the programmable environment, in inter-microservice communication.

Hereafter, a system according to the present disclosure is referred to as a QoS-aware message highway & queue (hereinafter referred to as "QMHQ") system, which will be described.

That is, the QMHQ system according to embodiments of the present disclosure may allow inter-microservice communication to be integrally performed in the application and network layers while ensuring service quality differentiation and asynchrony.

A method and system according to embodiments of the present disclosure will be described with reference to FIGS. 1 to 7.

FIG. 1 shows a configuration of a QMHQ system according to an embodiment of the present disclosure.

Referring to FIG. 1, the QMHQ system according to an embodiment of the present disclosure includes a QMHQ channel network (QMHQ-Net; 11), a communication processing unit 12, a service registration unit 13, and a network control unit 14.

Herein, the communication processing unit 12 may refer to a QMHQ-broker, the service registration unit 13 may refer to a QMHQ service registry, and the network control unit 14 may refer to a QMHQ network controller. Hereinafter, the communication processing unit 12, the service registration unit 13, and the network control unit 14 will be referred to as the QMHQ-broker, the service registry (or QMHQ service registry), and the network controller (or QMHQ network controller), respectively.

A physical network of the QMHQ-Net 11 is configured with a number of network routers/switch nodes, a cloud, a host server directly connected to the network, and the like to form an infrastructure capable of being virtualized, and allows microservices to be dynamically programmed in the cloud or network server so that applications are operated in a distributed microservice structure. A TCP/IP connection 111 or an end-to-end QoS-aware path 112 that connects between microservice components on a physical network is configured for inter-microservice communication.

The QMHQ-broker 12 is configured with a message-queue (MQ) 121 and message-highway (MH) 122, to manage communication between microservices. The MQ manages normal communication between microservices, and the MH processes communication that needs to guarantee quality of service, such as low latency or high reliability. The QMHQ-broker 12 may be configured with a central broker (hereinafter, referred to as "cBroker") that processes MQ operations, and a distributed broker (hereinafter, referred to as "dBroker") that is located on the host side where microservices are located to process MIR operation.

The service registry 13 controls and manages service and networking information for microservices when they are created and enabled. It records and manages service name and status, location information (e.g., IP Location), route ID which is a message-highway for communication between microservices, and collaborates with the QMHQ-broker 12 and the network controller 14.

The network controller 14 creates a message highway that may support the quality of service when there is a request form the microservice, and reports information on the same to the service registry 13. It may use end-to-end route setting based on segment routing, to support message highway capable of supporting QoS requirements, such as bandwidth, latency, and reliability.

Figure 2A:
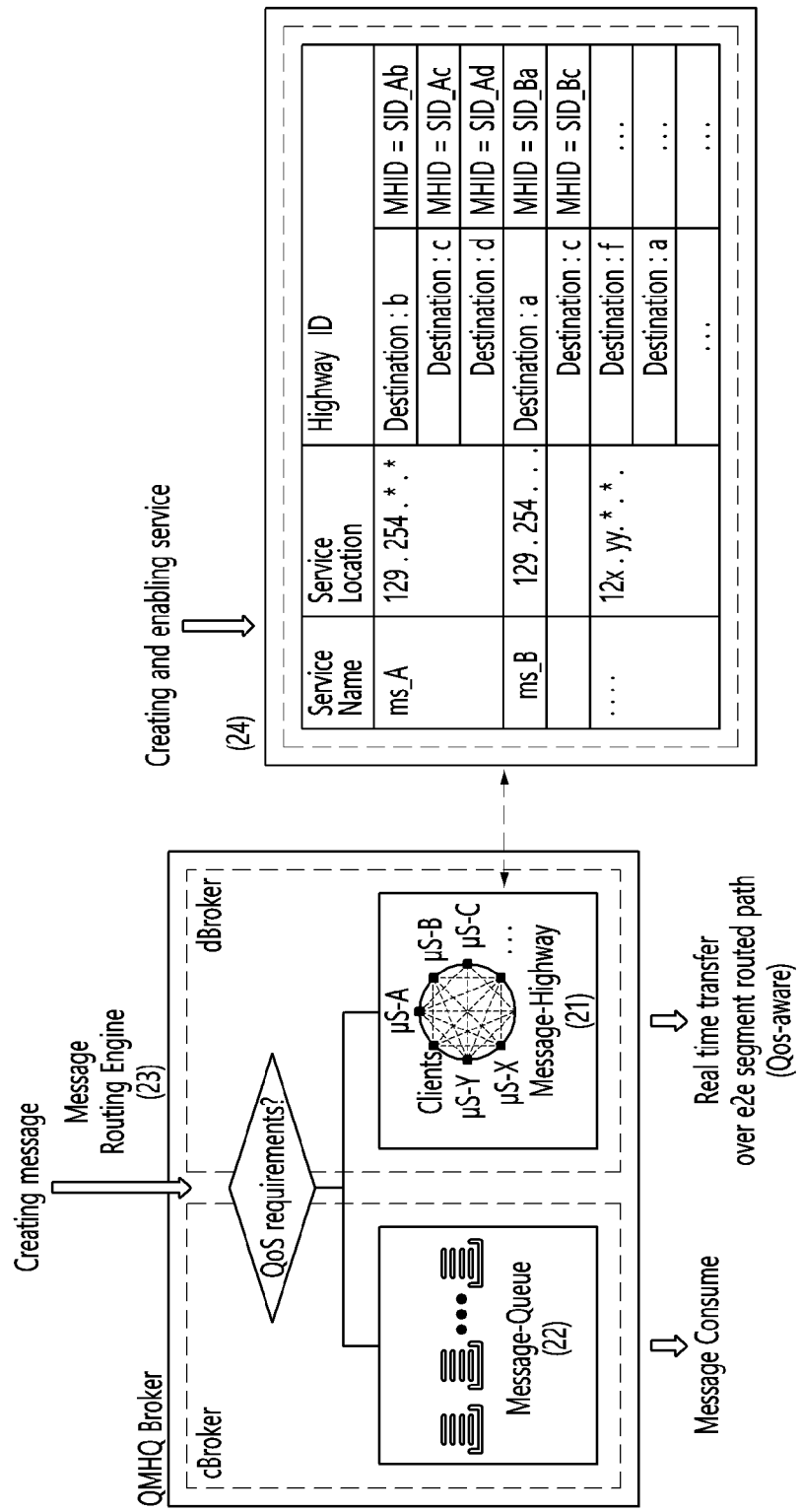
FIGS. 2A and 2B are exemplary diagrams showing a configuration of a message broker that manage inter-microservice communication in the QMHQ system.
Figure 2B:
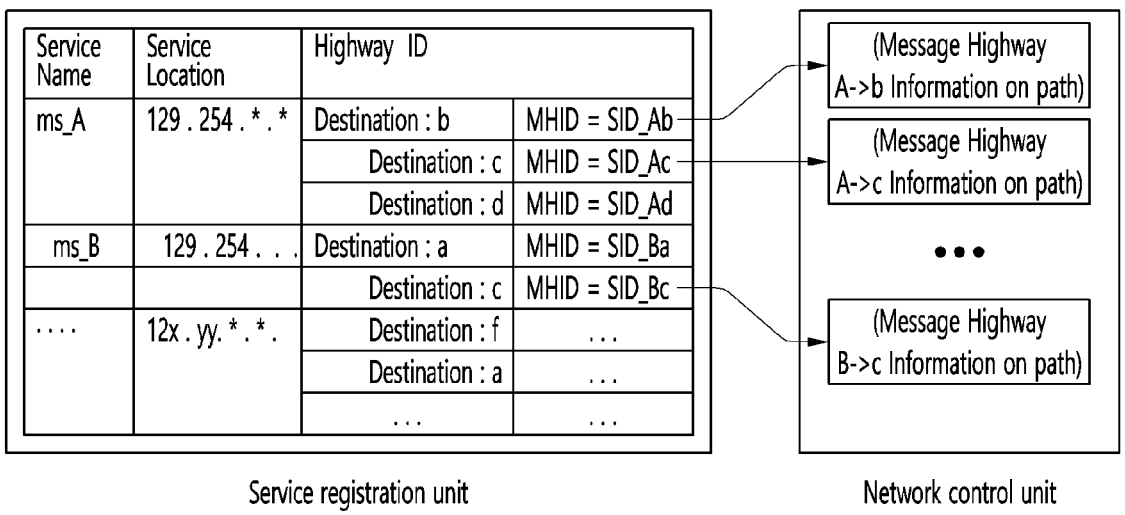

FIGS. 2A and 2B show an exemplary configuration of a message broker that manage inter-microservice communication in the QMHQ system.

As shown in FIGS. 2A and 2B, the QMHQ broker 12 may be configured with MIR 21, MQ 22, and the message routing engine 23. The message routing engine 23 queries the service registry 13 for the transmission/reception microservice and the QoS path information 24, and transfers the message through the MH or MQ mechanism. That is, the engine transfers, in the case of messages requiring real-time transfer, the same from the bBroker through the QoS-aware path through a method using the MH 21, and transfers, in the case of routine message, the same from the cBroker through a method using the MQ 22. For example, as shown in FIG. 2B, the network controller 14 may create MHs for two routes to support such a MH method between microservices and register them in the service registry 13; and the QMHQ broker 12 queries the service registry 13 for the message-highway ID (MHID), so that when the MHID exist in the route, the message may be transferred in the MH method, and when the MHID does not exist, the corresponding message may be transferred in the MQ method. Of course, an MH path between microservices may be requested to the network controller 14, if necessary, and then the network controller 14 may create information such as MHID and register it in the service registry 13 for real-time message transmission between two microservices.

Figure 2C:
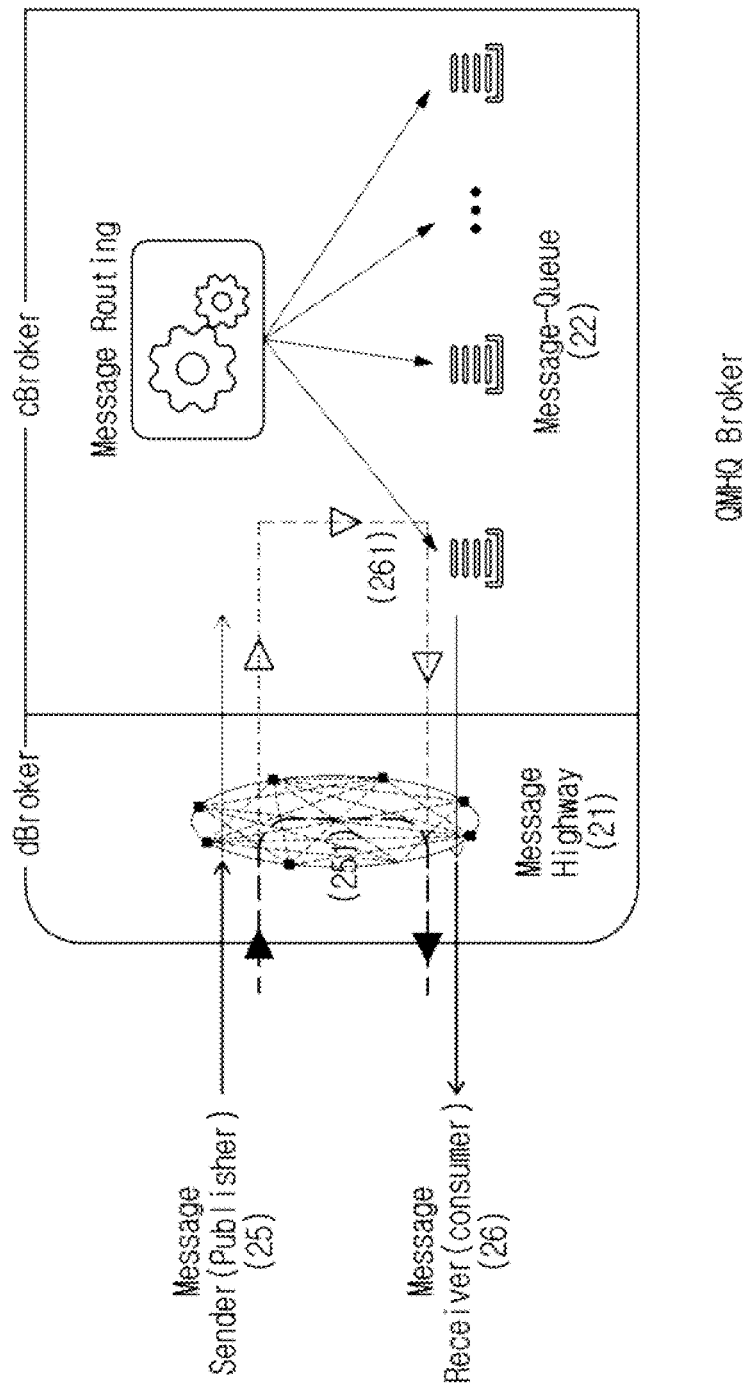
FIG. 2C is an exemplary diagram showing an operation in which inter-microservice communication is differentially performed depending on whether a quality of service is required in the QMHQ system.

FIG. 2C is an exemplary diagram showing an operation in which inter-microservice communication is differentially performed in the QMHQ system depending on whether the quality of service is required.

As shown in FIG. 2C, the QMHQ broker 12 is configured with a MH 21 distributed in the host where microservices are mounted, and a MQ 22 which is implemented centrally. If the sending microservice 25 that wants to communicate sends a message to the receiving microservice 26, when specifying a need for quality of service, the message is passed directly to the receiving microservice 26 via the QoS path MH 21 on dBroker (251). When requiring a need for quality of service, the communication is transferred in an asynchronous queuing & forwarding manner through the MQ 22 (261). The QMHQ broker 12 may allow to support the differentiated quality of service while ensuring independence and asynchrony between microservices through the highway and queue structure of the distributed structure.

Figure 3:
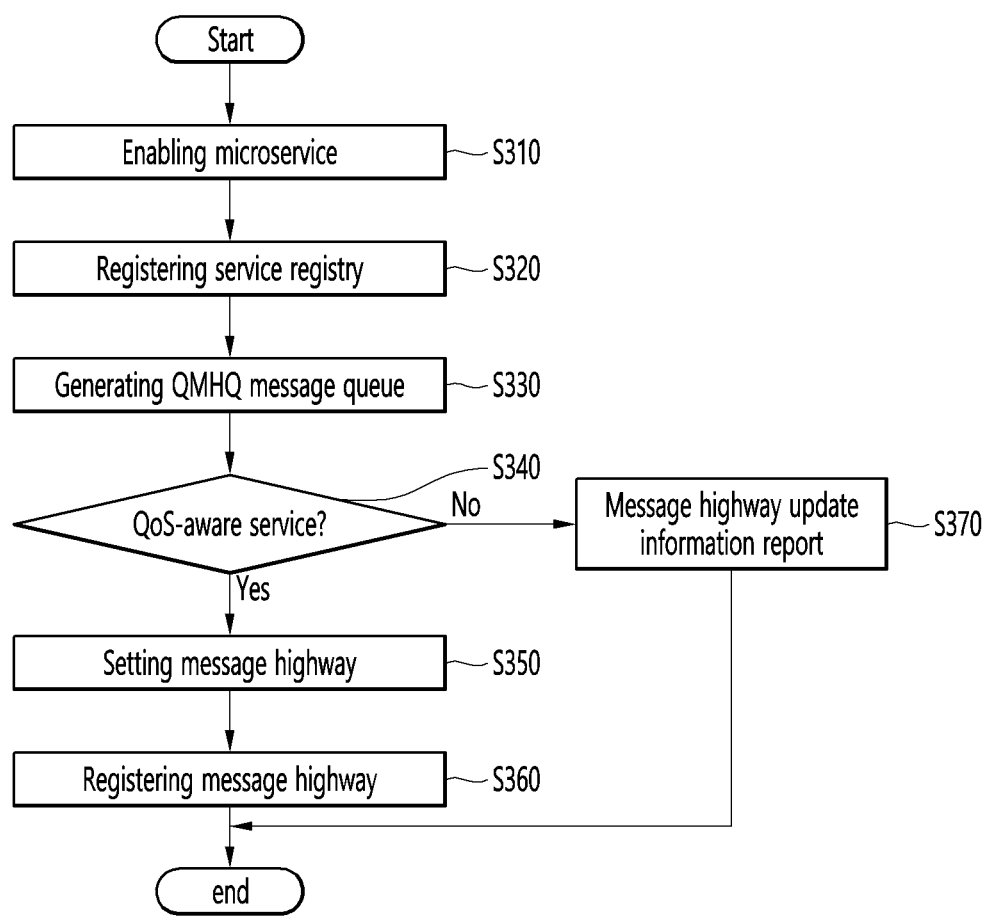
FIG. 3 is an operational flowchart showing processes of service registration and MH/MQ generation and registration which are performed in a service registry and a DMHQ broker, according to an embodiment.

FIG. 3 is an operational flowchart showing processes of service registration and MH/MQ generation and registration which are performed in a service registry and a DMHQ broker, according to an embodiment, in which the microservices are registered in the service registry and the MH and MQ are created for inter-microservice communication.

As shown in FIG. 3, when microservices are enabled, service name, status, location information, etc. are registered in the service registry (S310, S320). Then, it is requested the cBroker to create the QMHQ MQ (including name and location information), and when the MQ is requested to be created, it is newly created (S330). In addition, when quality of service assurance communication with other microservice elements is requested, the dBroker requests the network controller 14 to create (or set) the MEI, and registers information on the generated end-to-end QoS-aware path in the service registry 14 (S340, S350, S360).

Herein, a message requesting to create (or set) the MH may include information such as source information, destination information, QoS bandwidth, latency, and reliability, and highway information registered in the Service Registry 14 may include a name, location information, highway ID (SID), and the like.

Since the information on the updated 1\4H is reported to the dBroker, the dBroker maintains the latest MH path information (S370).

Figure 4:
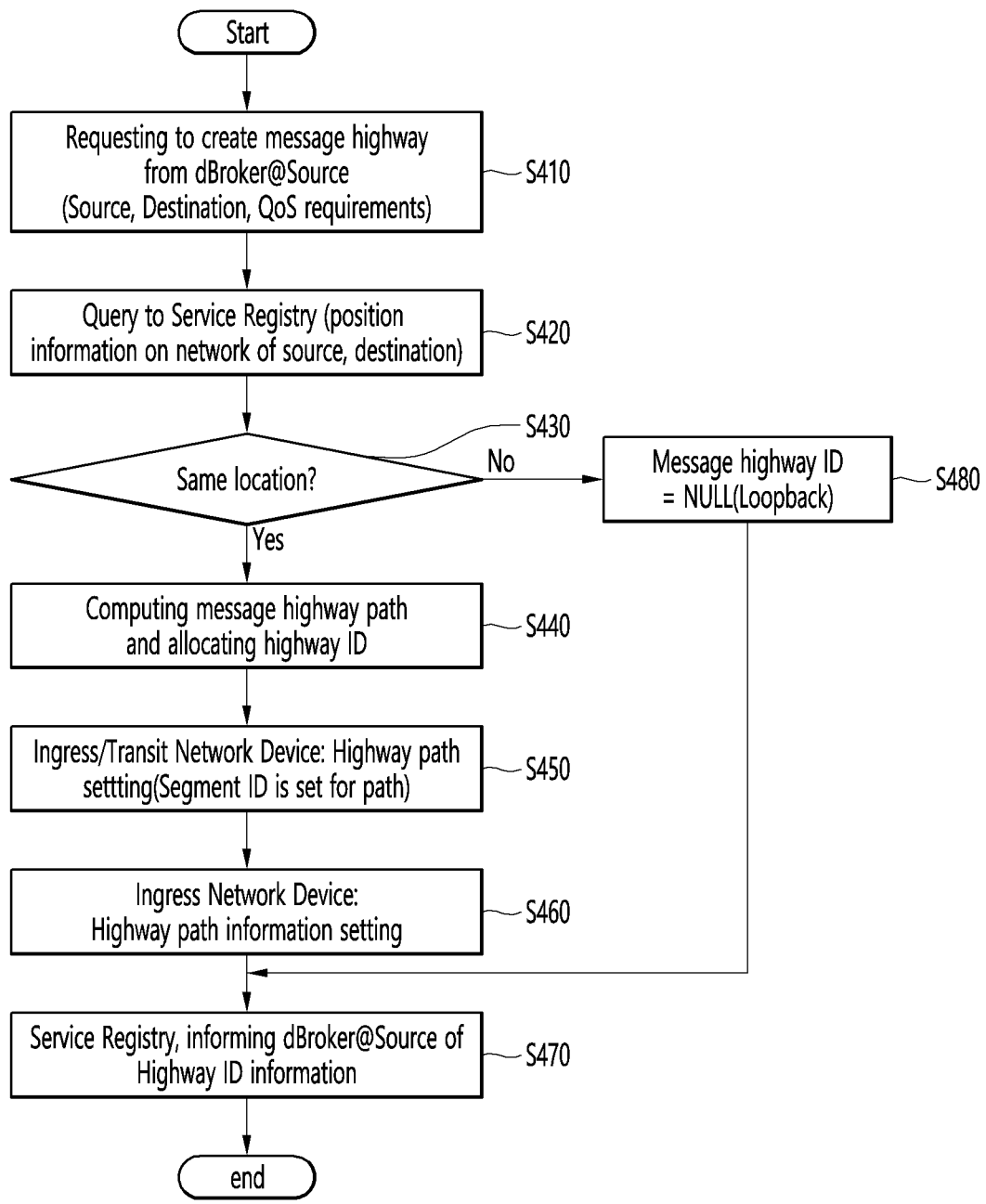
FIG. 4 is an operational flowchart showing a process of generating a message highway in a network controller, according to an embodiment.

FIG. 4 is an operational flowchart showing a process of creating a message highway in a network controller, according to an embodiment.

As shown in FIG. 4, the dBroker on the sending Microservice side requests the network controller to create a message highway (S410). The network controller queries the service registry for network-related location information of microservices on the sending and receiving side (S420). The transceiver information is checked to ensure that the sender and the receiver are in the same location. When they are not in the same location, a highway path capable of satisfying the QoS requirements of the requested connection is computed, and a highway ID is assigned (S430, S440). Here, the highway ID may include sender information, receiver information, and QoS requirements.

Subsequently, the path information is set so that the message packets may be switched to network devices on the highway path, for example, ingress/transit network device (S450). That is, the segment ID is set for ingress and transit network devices.

When the highway path information is set in step S450, the source microservice host informs the connected ingress network device of highway path information (S460). Here, the information may be encapsulated when sending a later message, and then used when message packets input from network devices are transferred through segment routing.

Subsequently, the highway ID is notified to the service registry and the dBroker on the source side (S470). As described above, this highway ID may be utilized as a binding segment ID.

Meanwhile, as a result of checking in step S430, when the sending and receiving microservices exist on the same host, a NULL ID is allocated for loopback (S480).

Figure 5:
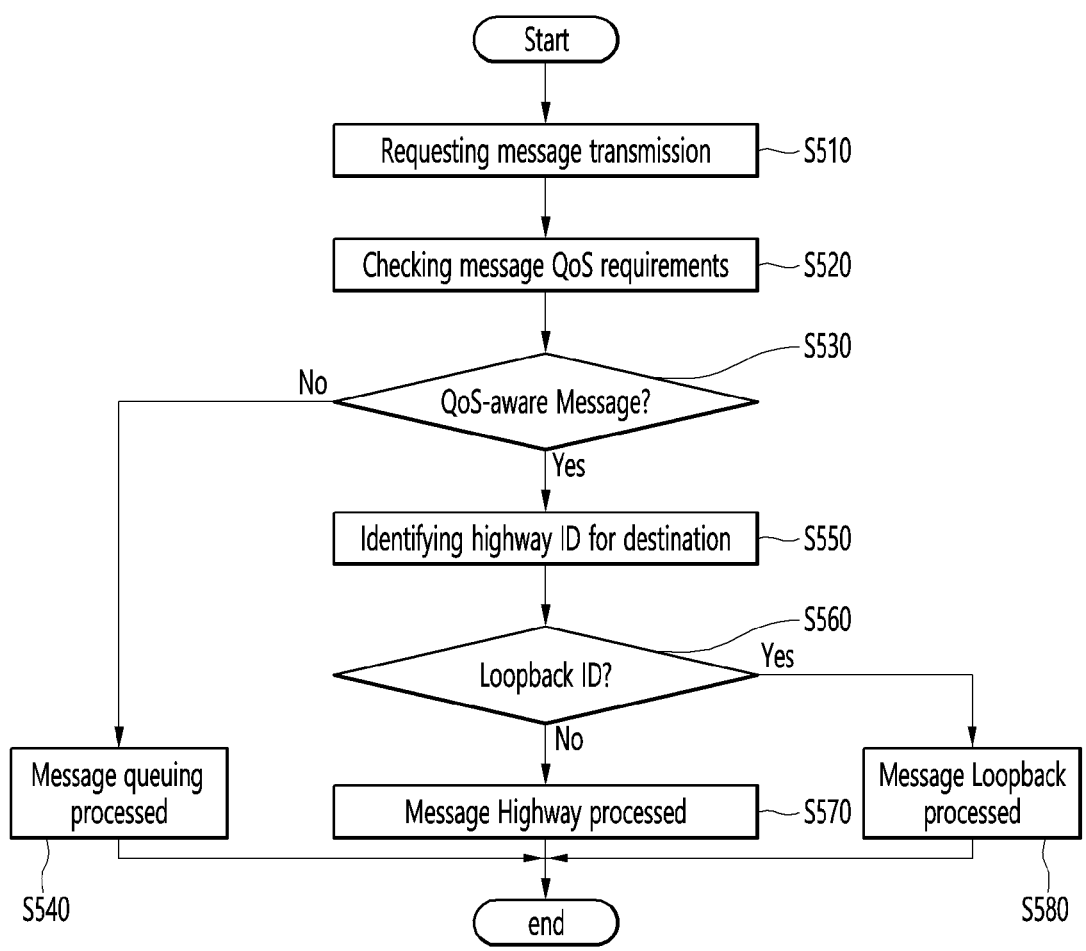
FIG. 5 is an operational flowchart showing a process of transmitting a message between microservices, according to an embodiment.

FIG. 5 is an operational flowchart showing a process of transmitting a message between microservices, according to an embodiment.

As shown in FIG. 5, when the transmitter requests message transmission (which may include Src, Dest, and QoS information), the distribution broker (dBroker@Sender) on the sender side checks the message QoS requirements (S510, S520).

In addition, it is checked whether there is a message requiring QoS transfer (QoS-aware Message). When it is a normal message that does not require QoS transfer, the message is send to the cBroker. The cBroker queries the service registry for destination network information, and then performs a normal message queuing procedure to transfer the message to the destination (S540).

As a result of identifying the highway ID for the destination in step S530, when the message is a message requesting QoS transfer, the highway ID for the destination is identified (S550). Here, when the highway is created and updated, the highway ID is notified to the dBroker and then maintained by the dBroker.

As a result of identifying the highway ID for the destination in step S550, when the highway ID is a loopback ID, that is, when the microservice on the destination exists in the same node, the message is immediately loopback-processed (S560, S580).

Meanwhile, as a result of checking the highway ID for the destination in the step S550, when the highway ID is not a loopback ID, that is, when the destination microservice exists in a different node, the highway ID is encapsulated in the message and transmitted to the network incoming terminal (S560, S570). When receiving the message with the highway ID, the network input node preferentially transfers the message to the corresponding highway path, that is, the segment routed QoS-aware path.

Figure 6:
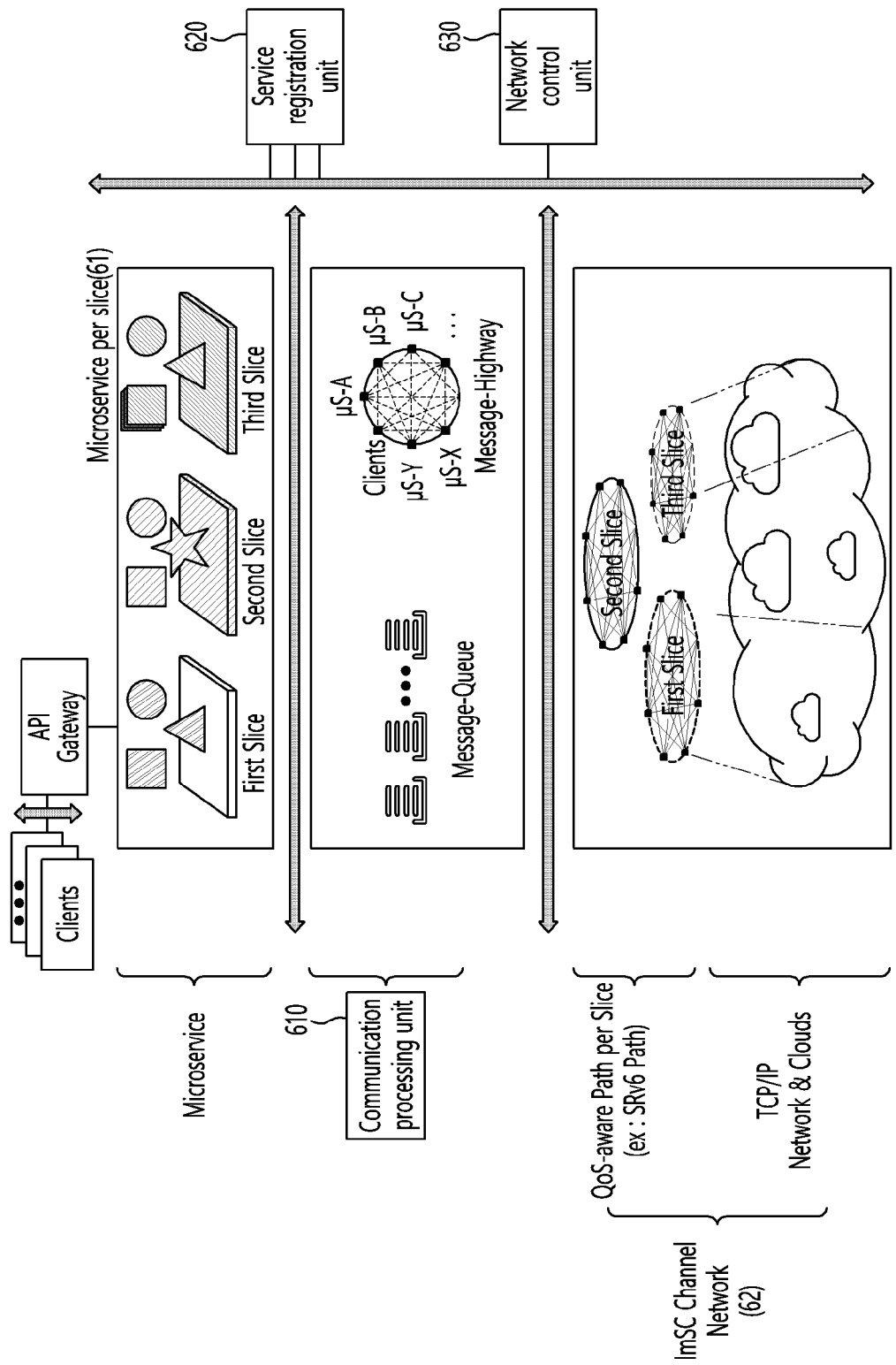
FIG. 6 is an exemplary diagram showing the configuration of the QMHQ system in multiple slices.

FIG. 6 is an exemplary diagram showing a configuration of the QMHQ system in multiple slices, in which the configuration of the DMHQ system in the infrastructure to which the slice concept is applied is shown to accommodate various applications.

The system of FIG. 6 may include a communication processing unit 610, a service registration unit 620 and a network control unit 630, as in the system of FIG. 1. The service registration unit 620 may be provided per slice. That is, the system of FIG. 6 is different from the system of FIG. 1 in that various applications may be provided, and the remaining functional aspects may operate in the same manner as in FIG. 1.

For example, as shown in FIG. 6, the microservice 61 may be configured with three slices (first slice, second slice, third slice), that may support applications such as eMBB, mMTC, and URLLC in 5G. The MR system of the QMHQ channel network 62 is also logically separated to support independent inter-microservice communication per slice. In addition, since the service registry is prepared per slice, the network control unit 630 is configured to separate access to slice. That is, when initially enabling microservices, by specifying which slice the microservice belongs to and the service registry in that slice, it is possible to separately operate the access to the slice. According to an embodiment, the microservice of the first slice is registered in the service registry of the first slice; the microservice of the second slice is registered in the service registry of the second slice; and the microservice of the third slice is registered in the service registry of the third slice, whereby the service registry may be separately operated per slice, to separate access to slice.

In case of supporting multiple slices, for inter-microservice communication between the source and the destination, when processing queries or reports, the service registry information may be used together. In other words, the service registry stores and manages service and networking information in an integrated manner, so that inter-microservice communication separated per slice may be performed.

Figure 7:
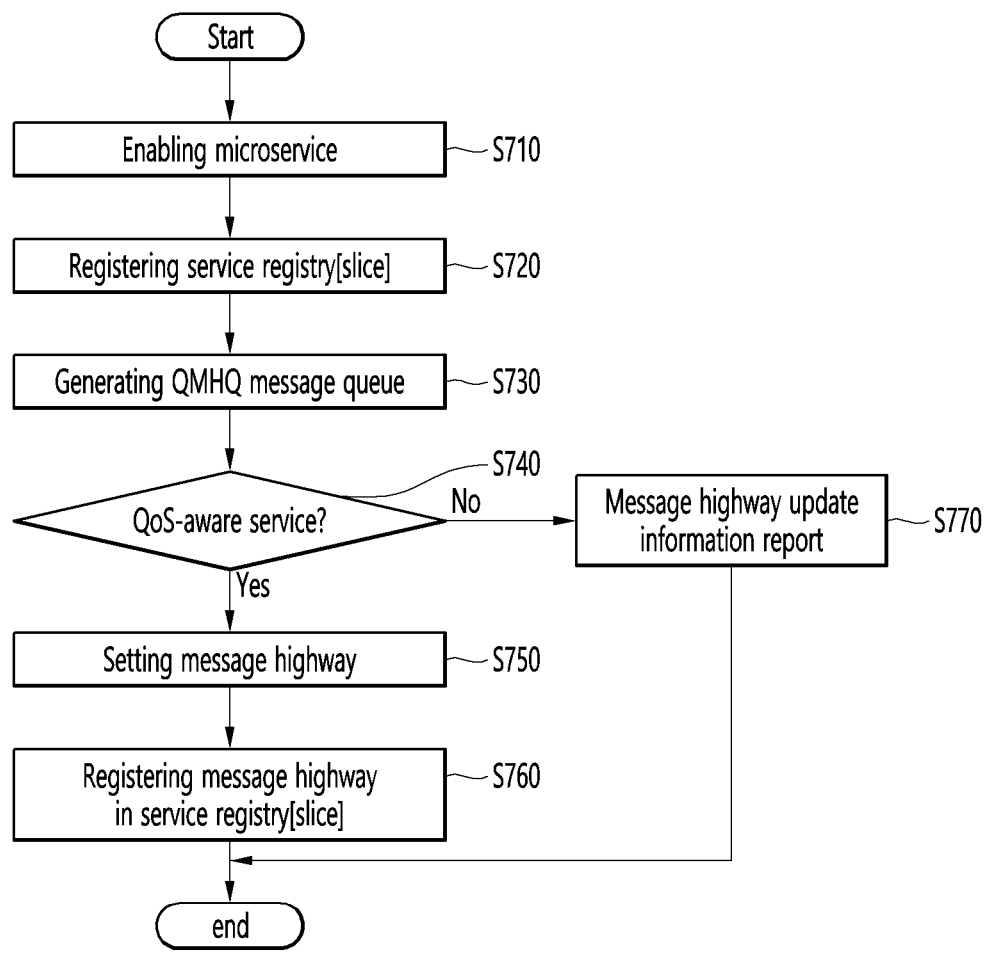
FIG. 7 is an operational flowchart showing processes of service registration and MH/MQ generation and registration in the service registry in multiple slices, according to an embodiment.

FIG. 7 is an operational flowchart showing processes of service registration and MH/MQ generation and registration in service registry in multiple slices, in which the microservice is registered in the service registry 620 in a multi-slice environment, and the MH and the MQ are created for inter-microservice communication.

As shown in FIG. 7, when the microservice is enabled, the service name, status, location information, etc. are registered in the service registry of the corresponding slice (S710, S720). Here, in step S710, when the microservice is enabled, by specifying the slice of the corresponding microservice, the service registry of the corresponding slice may be specified.

Subsequently, the cBroker is requested to create an MQ (including name and location information), and when the MQ is need to be created, it is newly created (S730). In addition, when QoS communication with other microservice elements is required, the dBroker requests the network controller 630 to create (or set) the MH, and registers information on the generated end-to-end QoS-aware path in the service registry of the corresponding slice (S740, S750, S760).

Herein the message requesting to create (or set) the MH may include information such as source information, destination information, QoS bandwidth, latency, and reliability, and the highway information registered in the service registry of a corresponding slice may include a name, location information, highway ID (SID), and the like.

The dBroker maintains the latest MEI route information by reporting information on the updated MEI to dBroker (S770).

In this way, the method and system for differentiating quality of service in inter-microservice communication according to an embodiment of the present disclosure, may allow to differentiate QoS-aware networking path and support service discovery and networking information acquisition in an integrated manner, to reduce the total service response time while ensuring independence and asynchrony between microservices, in inter-microservice communication in a distributed architecture.

In addition, the method and system for differentiating quality of service in inter-microservice communication according to an embodiment of the present disclosure, may quickly and safely set inter-microservice communication in one-stop, by supporting QoS-aware networking path (message highway) and asynchronous message queue in differentiate manner, and providing integrated control and management of microservice information and network information, through the QoS-aware message highway and queue method which considers the diversity of applications in inter-microservice communication, and provide separation between slices through the structure of having the service registries per slice That is, according to embodiments of the present disclosure, performance degradation, scalability, and security in inter-microservice communication are improved in a distributed microservice structure, so that inter-microservice communication capable of differentiating quality of service according to applications can be provided, which results in improving application service quality.

Although exemplary methods of this disclosure are presented as a series of operations for clarity of explanation, it is not intended to limit the order in which steps are performed, but each step may be performed simultaneously or in a different order if desired. In order to implement the method according to the present disclosure, other steps are included in addition to the steps illustrated, or the remaining steps are included with excluding some steps, or it may include additional other steps except for some steps.

The various embodiments of this disclosure are not listing all possible combinations, but are intended to illustrate representative aspects of the present disclosure. Matters described in various embodiments may be applied independently or may be applied in combination of two or more.

In addition, various embodiments of the present disclosure may be implemented by hardware, firmware, software, or a combination thereof. For implementation by hardware, it may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, a controller, microcontroller, microprocessor, or the like.

The scope of this disclosure includes software or machine-executable instructions (e.g., operating system, application, firmware, program, etc.) that cause operations in accordance with the methods of various embodiments to be executed on a device or computer, and a non-transitory computer-readable medium (non-transitory computer-readable medium) in which such software or instructions are stored and executable on a device or computer.

DESCRIPTION OF NUMERALS

12 Communication processing unit
13 Service registration unit
14 Network control unit

What is claimed is:

1. A system for differentiating quality of service (QOS) in inter-microservice communication, the system comprising:
    a network control unit configured to, upon a request from a communication processing unit, generate a QoS-aware path for guaranteeing QoS between a sending microservice and a receiving microservice before execution of inter-microservice communication;
    a service registration unit registering information about the QoS-aware path between the sending and receiving microservices; and
    when guaranteeing the quality of service of a message received from the sending microservice is necessary, the communication processing unit identifying the QoS-aware path between the sending microservice and the receiving microservice from the information on the registered QoS-aware path, and processing the inter-microservice communication to allow the message to be transferred to the receiving microservice through the identified QoS-aware path.

2. The system of claim 1, wherein when the quality of service is requested to be guaranteed from the sending microservice, the network control unit receives network location information of the sending microservice and the receiving microservice from the service registration unit, and generates the QoS-aware path between the sending microservice and the receiving microservice based on the received network location information.

3. The system of claim 1, wherein the communication processing unit receives the information on the QoS-aware path updated in the service registration unit, and processes the inter-microservice communication based on the updated information about the QoS-aware path.

4. The system of claim 1, wherein when a new microservice is created and the created microservice is enabled, the service registration unit provides integrated control and management of service information and networking information on the QoS-aware path of the enabled microservice.

5. The system of claim 1, wherein when a plurality of slices is included, the service registration unit includes each service registry that independently supports each of the plurality of slices.

6. The system of claim 1, wherein the communication processing unit comprises:
    a first communication processer processing the message through the identified QoS-aware path; and a second communication processor processing the message in a message queuing method.

7. The system of claim 6, wherein the first communication processor is located on a host side where the sending microservice is located.

8. The system of claim 1, wherein the communication processing unit queries the service registration unit for IDs for the sending microservice, the receiving microservice, and the quality of service path and, when the ID for the QoS-aware path exists, processes the message through the QoS-aware path of the corresponding ID.

9. The system of claim 8, wherein the communication processing unit loopback-processes the message, when the ID for the QoS-aware path is a NULL ID.

10. The system of claim 1, wherein when the QoS-aware path is requested to be generated from the communication processing unit, the network control unit calculates the QoS-aware path that satisfies the requested QoS to allocate an ID for the calculated QoS-aware path, and provides the allocated ID for the QoS-aware path to the service registration unit and the communication processing unit.

11. The system of claim 10, wherein the network control unit allocates a NULL ID as the ID for the calculated QoS-aware path, when the sending microservice and the receiving microservice exist in the same host.

12. A method of differentiating quality of service (QOS) in inter-microservice communication, the method comprising:
generating a QoS-aware path for guaranteeing quality of service between a sending microservice and a receiving microservice before execution of inter-microservice communication;
registering information on the QoS-aware path between the sending and receiving microservices;
in response to determining that guaranteeing the quality of service of a message received from the sending microservice is necessary, identifying the QoS-aware path between the sending microservice and the receiving microservice from the registered information on the QoS-aware path; and
processing the inter-microservice communication to allow the message to be transferred to the receiving microservice through the identified QoS-aware path.

13. The method of claim 12, wherein the generating comprises:
receiving network location information of the sending microservice and the receiving microservice in response to the quality of service being requested to be guaranteed from the sending microservice, and generating the QoS-aware path between the sending microservice and the receiving microservice based on the received network location information.

14. The method of claim 12, wherein the registering comprises:
in response to a new microservice being created and the created microservice being enabled, providing integrated control and management of service information and networking information on the QoS-aware path of the enabled microservice.

15. The method of claim 12, wherein the registering comprise:
in a multi-slice environment where a plurality of slices is included, independently registering the information on the QoS-aware path between microservices of each of the plurality of slices, to independently control and manage the QoS-aware path of each of the plurality of slices.

16. The method of claim 12, wherein the processing comprises:
querying IDs for the sending microservice, the receiving microservice and the quality of service path, and processing the message through the QoS-aware path of the corresponding ID in response to determination that the ID for the QoS-aware path exists.

17. The method of claim 16, wherein the processing comprises loopback-processing the message, in response to determination that the ID for the QoS-aware path is a NULL ID.

18. The method of claim 12, further comprising:
in response to the QoS-aware path being requested to be generated, calculating the QoS-aware path that satisfies the requested QoS to allocate an ID for the calculated QoS-aware path,
wherein the registering comprises registering information including the allocated ID for the QoS-aware path.

19. The method of claim 18, wherein the allocating comprises allocating a NULL ID as the ID for the calculated QoS-aware path, in response to determination that the sending microservice and the receiving microservice exist in the same host.

20. An apparatus for ensuring quality of service (QOS) between microservices, the apparatus comprising:
a communication processing unit;
a service registration unit operatively connected to the communication processing unit; and
a network processing unit operatively connected with the service registration unit,
wherein the network processing unit:
upon a request from the communication processing unit, generates a QoS-aware path to ensure QoS between a sending microservice and a receiving microservice before execution of inter-microservice communication;
registers information on the QoS-aware path between the sending and receiving microservices; and
when guaranteeing the quality of service of a message received from the sending microservice is necessary, identifies the QoS-aware path between the sending microservice and the receiving microservice from the registered information on the QoS-aware path, and processes inter-microservice communication to allow the message to be transferred to the receiving microservice through the identified QoS-aware path.

* * * * *